(12) United States Patent
Zhang et al.

(10) Patent No.: US 12,050,636 B2
(45) Date of Patent: Jul. 30, 2024

(54) GENERATING DOCUMENT SUMMARY

(71) Applicant: Microsoft Technology Licensing, LLC, Redmond, WA (US)

(72) Inventors: Xingxing Zhang, Redmond, WA (US); Shaohan Huang, Redmond, WA (US); Lei Cui, Beijing (CN); Tao Ge, Redmond, WA (US); Furu Wei, Redmond, WA (US); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 17/056,728

(22) PCT Filed: Jun. 17, 2019

(86) PCT No.: PCT/US2019/037413
§ 371 (c)(1),
(2) Date: Nov. 18, 2020

(87) PCT Pub. No.: WO2020/005604
PCT Pub. Date: Jan. 2, 2020

(65) Prior Publication Data
US 2021/0166014 A1      Jun. 3, 2021

(30) Foreign Application Priority Data
Jun. 29, 2018    (CN) .......................... 201810714779.1

(51) Int. Cl.
*G06F 16/34*    (2019.01)
*G06F 18/213*    (2023.01)
(Continued)

(52) U.S. Cl.
CPC .......... *G06F 16/345* (2019.01); *G06F 18/213* (2023.01); *G06F 18/214* (2023.01);
(Continued)

(58) Field of Classification Search
None
See application file for complete search history.

(56) References Cited

U.S. PATENT DOCUMENTS 6,826,724 B1 * 11/2004  Shimada ............... G06F 16/313
                                          707/E17.084
6,895,552 B1    5/2005  Balabanovic et al.
(Continued)

OTHER PUBLICATIONS

Glorot, et al., "Deep Sparse Rectifier Neural Networks", In Proceedings of the Fourteenth International Conference on Artificial Intelligence and Statistics, Apr. 11, 2011, pp. 315-323.
(Continued)

*Primary Examiner* — Santiago Garcia
(74) *Attorney, Agent, or Firm* — Schwegman Lundberg & Woessner, P.A.

(57) ABSTRACT

According to implementations of the subject matter described herein, there is provided a solution for generating a summary of a document. In this solution, feature information of pages comprised in a document is extracted, which characterizes at least one type of content contained in each page. Respective importance of the pages is determined at least based on the extracted feature information. A summary of the document is generated for the document by selecting a predetermined number of pages less than the number of the pages based on the respective importance. Through the solution, instead of providing all the pages, pages containing important content may be determined automatically to serve as the summary of the document. This summary allows the user to learn quickly main content of the document, shorten the time consumed in browsing all documents and/or facilitate location of a document of interest as soon as possible.

17 Claims, 7 Drawing Sheets

(51) Int. Cl.
  *G06F 18/214* (2023.01)
  *G06F 40/30* (2020.01)
  *G06V 30/262* (2022.01)
  *G06V 30/413* (2022.01)
(52) U.S. Cl.
  CPC ............ *G06F 40/30* (2020.01); *G06V 30/274* (2022.01); *G06V 30/413* (2022.01)

(56) References Cited

U.S. PATENT DOCUMENTS

| | | | |
|---|---|---|---|
| 2005/0160369 A1 | 7/2005 | Balabanovic et al. | |
| 2005/0278624 A1* | 12/2005 | Nishikawa | G06T 11/60 715/236 |
| 2013/0006973 A1* | 1/2013 | Caldwell | G06F 16/345 707/723 |
| 2013/0311471 A1* | 11/2013 | Okajima | G06F 16/345 707/737 |
| 2016/0103824 A1* | 4/2016 | Zupancic | G06F 40/205 704/9 |
| 2016/0103875 A1* | 4/2016 | Zupancic | G06F 40/253 707/773 |
| 2017/0053027 A1* | 2/2017 | Simske | G06F 16/335 |
| 2018/0047190 A1* | 2/2018 | Gnutzmann | G06K 15/1847 |
| 2019/0129942 A1* | 5/2019 | Seuss | G06F 40/56 |
| 2019/0303663 A1* | 10/2019 | Krishnapura Subbaraya | G06V 30/413 |

OTHER PUBLICATIONS

He, et al., "Deep Residual Learning for Image Recognition", In Proceedings of the IEEE Conference on Computer Vision and Pattern Recognition, Jun. 27, 2016, pp. 770-778.

"International Search Report and the Written Opinion Issued in PCT Application No. PCT/US2019/037413", Mailed Date: Aug. 27, 2019, 10 Pages.

Pennington, et al., "GloVe: Global Vectors for Word Representation", In Proceedings of the Conference on Empirical Methods in Natural Language Processing, Oct. 25, 2014, pp. 1532-1543.

Srivastava, et al., "Dropout: A Simple Way to Prevent Neural Networks from Overfitting", In Journal of Machine Learning Research, vol. 15, Issue1, Jan. 2014, pp. 1929-1958.

"First Office Action and Search Report Issued in Chinese Patent Application No. 201810714779.1", Mailed Date: Mar. 27, 2023, 14 Pages.

* cited by examiner

GENERATING DOCUMENT SUMMARY

CROSS-REFERENCE TO RELATED APPLICATION

This application is a U.S. National Stage Filing under 35 U.S.C. 371 of International Patent Application Serial No. PCT/US2019/037413, filed Jun. 17, 2019, and published as WO 2020/005604 A1 on Jan. 2, 2020, which claims priority to Chinese Application No. 201810714779.1, filed Jun. 29, 2018, which applications and publication are incorporated herein by reference in their entirety.

BACKGROUND

People usually need to search for or review various documents such as presentation slide documents, word processing documents, and the like in activities such as routine work, studies, conferences, and the like. Sometimes one document may contain a lot of pages. The user has to spend massive time to read through all the pages to learn about main content in the document. If there are a large number of documents to be read, more time will be taken. For example, in a scenario of performing search, a search engine returns a great number of documents as search results; and the user may need to browse all pages of each of the documents to determine whether that document includes the desired content. Such inefficient document browsing cannot provide fast and convenient localization of documents and may cause unnecessary time wasting for the user.

SUMMARY

In accordance with implementations of the subject matter described herein, there is provided a solution for generating a summary of a document. In the solution, feature information of a plurality of pages comprised in a document is extracted, and the feature information of each page characterizes at least one type of content contained in the page. Respective importance of the plurality of pages in the document is determined at least based on the extracted feature information. A summary is generated for the document by selecting a predetermined number of pages from the plurality of pages based on the respective importance, and the predetermined number is less than the number of the plurality of pages. Through the solution, instead of providing all the pages, pages containing important content may be determined automatically from a plurality of pages of the document to serve as the summary of the document. This summary of the document allows the user to learn quickly main content of the document, shorten the time consumed by the user in browsing all documents, and/or facilitate location of a document of interest as soon as possible.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

The subject matter described herein will now be discussed with reference to several example implementations. It is to be understood these implementations are discussed only for the purpose of enabling those skilled persons in the art to better understand and thus implement the subject matter described herein described herein, rather than suggesting any limitations on the scope of the subject matter.

As used herein, the term "includes" and its variants are to be read as open terms that mean "includes, but is not limited to." The term "based on" is to be read as "based at least in part on." The term "an implementation" and "an implementation" are to be read as "at least an implementation." The term "another implementation" is to be read as "at least one other implementation." The terms "first," "second," and the like may refer to different or same objects. Other definitions, either explicit or implicit, may be included below.

As mentioned above, when a document includes a plurality of pages, a user needs to spend a lot of time to browse all pages for a document to grasp important contents therefrom. Therefore, it is necessary to generate a summary for a document for presenting main content of the document. To this end, there is proposed a solution for generating a summary of a document in implementations of the subject matter described herein. The solution involves extracting feature information of a plurality of pages of the document, and the extracted feature information characterizes at least one type of content contained in respective pages. Respective importance of a plurality of pages in the document is determined based on the extracted feature information, and some of the plurality of pages is selected based on the determined importance for generating the summary of the document. By feature extraction and importance analysis based on the features, pages including important content may be determined automatically from the plurality of pages of the document, instead of all pages serving as the summary of the document. The summary of the document allows a user to obtain main content of the document quickly, shorten the time consumed by the user in browsing all documents, and/or facilitate location of a document of interest as soon as possible so as to determine a next operation to be performed on the certain document (for example, browsing, downloading, forwarding, and/or the like).

Figure 1:
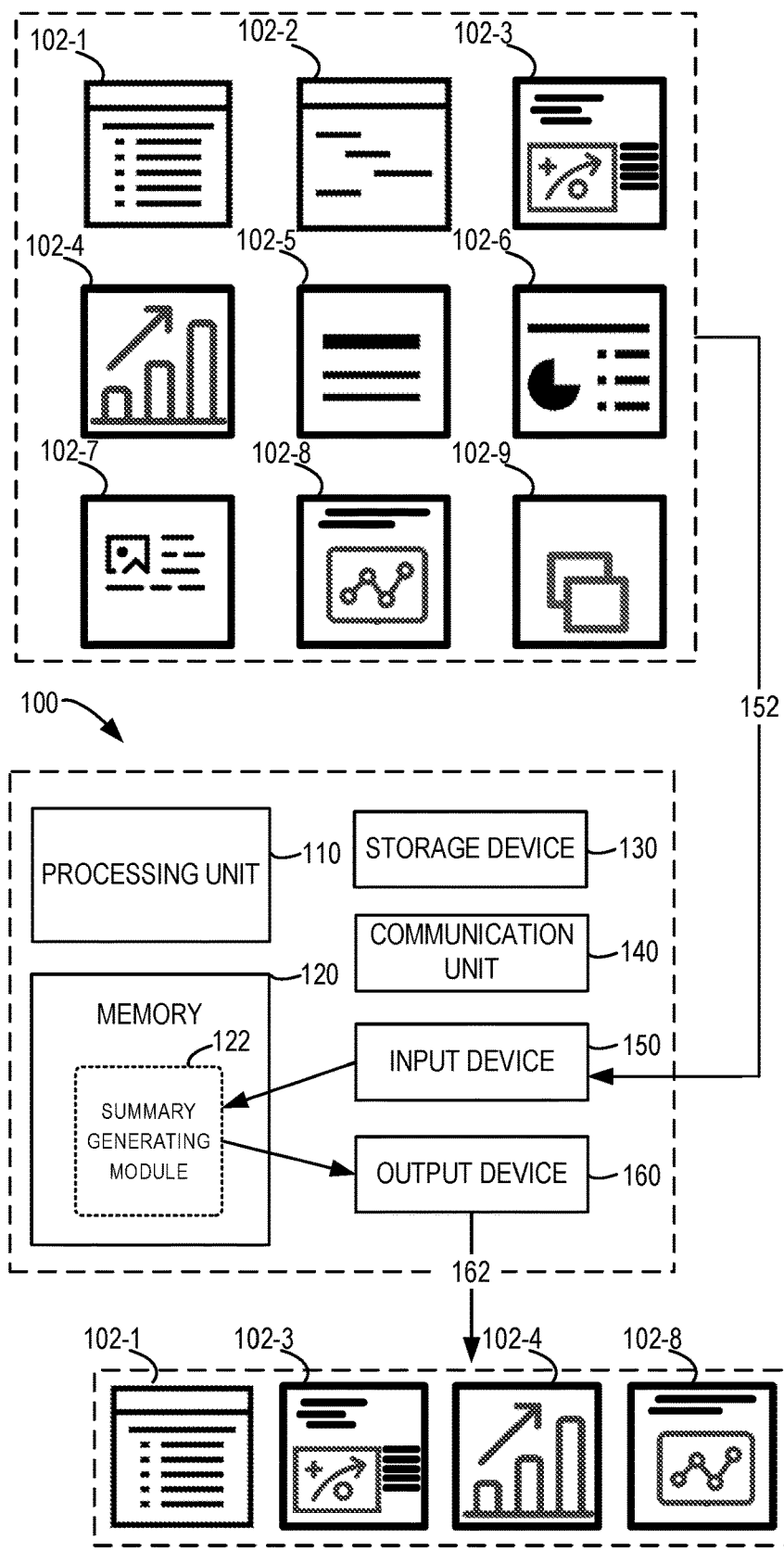
FIG. 1 illustrates a block diagram of a computing environment in which a plurality of implementations of the subject matter described herein can be implemented.

Basic principles and various example implementations of the subject matter described herein will now be described with reference to the drawings. FIG. 1 illustrates a block diagram of a computing device 100 in which implementations of the subject matter described herein can be implemented. It would be appreciated that the computing device 100 described in FIG. 1 is merely for purpose of illustration, without suggesting any limitation to the functions and scopes of implementations of the subject matter described herein in any manner. As shown in FIG. 1, the computing device 100 includes a computing device 100 in a form of general-purpose computing device. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as various user terminals or service terminals. The service terminal may be any server, large-scale computing device or the like that is provided by various service providers. The user terminal may for example be any type of mobile terminal, fixed terminal, or portable terminal, including a mobile telephone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combinations thereof, including accessories and peripherals of these devices, or any combinations thereof. It would be appreciated that the computing device 100 can support any type of interface for a user (such as a "wearable" circuit and the like).

The processing unit 110 may be a physical or virtual processor and can perform various processes based on programs stored in the memory 120. In a multi-processor system, multiple processing units execute computer-executable instructions in parallel so as to improve the parallel processing capacity of the computing device 100. The processing unit 110 may also be referred to as a central processing unit (CPU), a microprocessor, a controller or a microcontroller.

The computing device 100 typically includes a plurality of computer storage medium. Such medium may be any available medium accessible by the computing device 100, including, but not limited to, volatile and non-volatile medium, and removable and non-removable medium. The memory 120 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any removable or non-removable medium and may include machine-readable medium, such as a RAM, flash drive, disk or any other medium, which can be used for storing information and/or data and accessed in the computing device 100.

The computing device 100 may further include additional removable/non-removable, volatile/non-volatile memory medium. Although not shown in FIG. 1, a disk drive is provided for reading and writing a removable and non-volatile disk and a disc drive is provided for reading and writing a removable non-volatile disc. In these cases, each drive is connected to the bus (not shown) via one or more data medium interfaces.

The communication unit 140 communicates with a further computing device via communication medium. Additionally, functions of components in the computing device 100 may be implemented by a single computing cluster or multiple computing machines that can communicate via communication connections. Therefore, the computing device 100 may operate in a networked environment using a logical connection with one or more other servers, network personal computers (PCs) or further general network nodes.

The input device 150 may include one or more of a variety of input devices, such as a mouse, a keyboard, a tracking ball, a voice-input device, and the like. The output device 160 may be one or more of a variety of output devices, such as a display, a loudspeaker, a printer and the like. By means of the communication unit 140, the computing device 100 may further communicate with one or more external devices (not shown) such as the storage device, display device and the like, with one or more devices that enable users to interact with the computing device 100, or any devices (for example, a network card, modem, and the like) that enable the computing device 100 to communicate with one or more other computing devices, if required. Such communication may be performed via an input/output (I/O) interface (not shown).

In some implementations, as an alternative of being integrated on a single device, some or all components of the computing device 100 may also be arranged in form of cloud computing architecture. In the cloud computing architecture, these components may be provided remotely, and may work together to implement the functions described herein. In some implementations, the cloud computing provides computing, software, data access and storage service, which will not require end users to be aware of the physical location or configuration of the systems or hardware that provides these services. In various implementations, the cloud computing provides the services via a wide area network (for example, Internet) using an appropriate protocol. For example, a cloud computing provider provides applications over a wide area network, which can be accessed through a web browser or any other computing components. Software or components of the cloud computing architecture and respective data may be stored on a server at a remote location. Computing resources in a cloud computing environment may be merged or distributed at a location in a remote data center. Cloud computing infrastructures may provide the services through a shared data center, though they behave as a single access point for the user. Hence, the cloud computing architecture may be used to provide the components and functionalities as described herein from a service provider at a remote location. Alternatively, they may be provided from conventional servers or installed directly or otherwise on a client device.

The computing device 100 may be used to implement generation of document summary in a plurality of implementations of the subject matter described herein. The memory 120 may include one or more modules, each of which includes one or more program instructions, and these modules can be accessed and operated by the processing unit 110, so as to implement functionalities of various implementations described herein. For example, the memory 120 may include a summary generating module 122 for performing generating a summary of a document.

When generating the summary is performed, the computing device 100 can receive a document 152 via an input device 150. The document 152 includes a plurality of pages, for example, page 102-1 to page 102-9, which are collectively referred to as a page 102 herein. The document 152 is provided to a summary generating module 122, to cause the summary generating module 122 to select some pages 102 from the document 152 as a summary 162 of the document 152 output by the output device 160. In the example as shown in FIG. 1, the summary generating module 122 selects the page 102-1, page 102-3, page 102-4, and page 102-8 from the document 152 as a summary 162 of the document 152 for output.

It would be appreciated that the form of the page, the number of pages included in the document, and the number of the pages included in the summary as shown in FIG. 1 are provided merely for purpose of illustration. In other examples, a document may include any number of pages containing any content, and the generated summary may also include any number of pages. Pages selected as a summary from a document will also vary depending on the technique used by the summary generating module.

Figure 2:
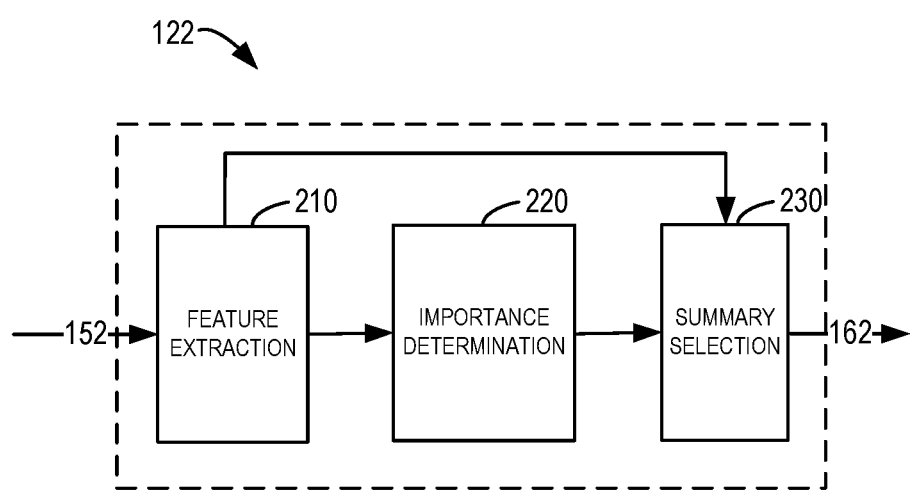
FIG. 2 illustrates a block diagram of a summary generating module in accordance with an implementation of the subject matter described herein.

How a summary 162 of a document 152 is generated by a summary generating module 122 will be described below in detail with reference to FIGS. 2 to 5C. FIG. 2 illustrates a summary generating module 122 for generating a summary of a document in accordance with some implementations of the subject matter described herein. As shown, the summary generating module 122 includes a feature extraction module 210, an importance determination module 220 and a summary selection module 230.

The feature extraction module 210 is configured to receive the document 152 including a plurality of pages 102. The feature extraction module 210 is configured to extract feature information of a plurality of pages, and the feature information of each page characterizes at least one type of content contained in the page. The features extracted by the feature extraction module 210 are provided to the importance determination module 220 which is configured to determine respective importance of the plurality of pages 102 in the document 152 based on the plurality of extracted features. The importance of a page indicates whether the page includes main or important content of the document 152.

The summary selection module 230 is configured to select a predetermined number of pages (for example, K pages) from the plurality of pages 102 of the document 152 based on the importance determined by the importance determination module 220, to generate a summary for the document. The predetermined number of pages selected is less than the number of pages included in the document 152. It is supposed that the number of pages includes in the document 152 is N (N is an integer greater than 1) and the predetermined number of pages included in the summary is K, then K<N. The predetermine number may be preconfigured by a user or system and is fixed for a plurality of documents. Alternatively, the predetermined number may vary dynamically, for example, vary with the values of the determined importance or the total number of pages included in the document. For example, one or more pages with their importance greater than a certain threshold importance may be selected from the document 152 for generating the summary 162. For another example, if the number of pages included in a document 152 is relatively large, a larger predetermined number may be determined, or vice versa.

In accordance with the implementations of the subject matter described herein, the generated summary includes a smaller number of pages, facilitating a user to browse important content of the document quickly so as to make a decision of a next step, for example, whether to browse all pages, download the document, forward the document, utilize the document for other purposes, and/or the like.

In some implementations, the document 152 may include various formats of document, such as presentation slide documents, word processing documents, webpages, printable document format (PDF) documents and the like. For these types of documents, corresponding applications (for example, presentation applications, word processing applications, webpage browsing application, PDF readers and the like) may be used to present pages 102 included in the document. The pages 102 may include different types of content. For example, a page of a presentation slide document may typically include a combination of any of delicately arranged texts, images (such as inserted pictures, clipart, icons, background images, charts, and the like), and inserted multimedia (such as video, audio, and the like). A document in other format may also include one type or a combination of different types of contents. For example, in a word processing document, some pages may include a combination of words with pictures, symbols and charts, in addition to pages only including text, to enrich presentation of content of the pages.

Typically, in one document, whether a page is important is related to the content included in the page. In order to identify important pages from a plurality of pages, feature information of each page may be determined in a feature extracting manner for characterizing the content included therein. The extracted feature information may be used to measure whether each page is important in the page. In some implementations, the feature extraction module 210 may be configured to extract different feature information of the page based on different types of content included in each page 102.

Figure 3:
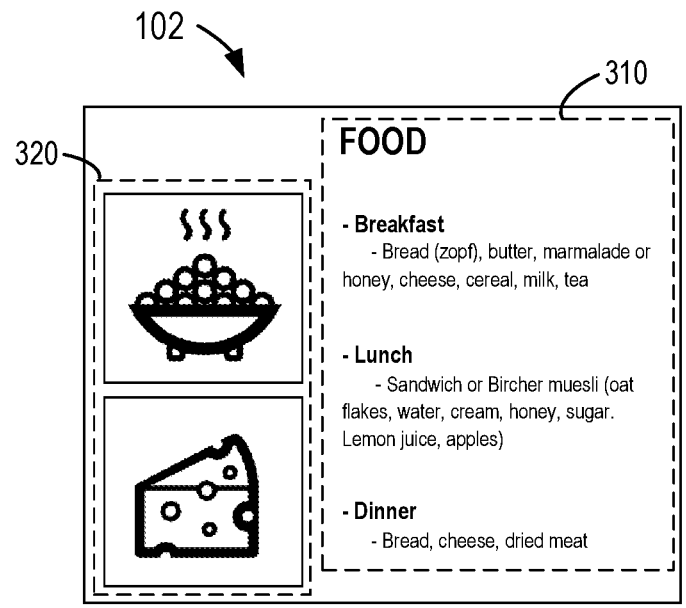
FIG. 3 illustrates a schematic diagram of an implementation of feature extraction and importance determination based on a neural network in accordance with an implementation of the subject matter described herein.

In an implementation, if it is determined that the content contained in the page 102 includes a text, the semantic meaning and the length of the text may be used to characterize the content of the page 102. Therefore, the feature extraction module 210 may be configured to extract feature information related to the text of the page 102, including one or more of the semantic feature of the text and feature information indicating the number of words included in the text. FIG. 3 illustrates an example of a page 102, in which the page 102 includes a text 310 including a title in the form of text and a body in the form of text. The feature extraction module 210 may be configured to extract a semantic feature of the text 310 and the number of words included in the text 310.

In an implementation, if it is determined that one or more images are included in the page 102, the locations of the images in the page, the occupied areas of the images in the page (which are related to the sizes and the number of the images), and the features of the image contents included therein may be used to characterize the content of the page 102. Therefore, the feature extraction module 210 may be configured to extract one or more of feature information related to images of the page 102, including a feature map of the images, feature information indicating the occupied area of the images in the page, and feature information indicating the locations of the images in the page. For example, in the example of FIG. 3, the page 102 includes an image portion 320 which includes two images. The feature extraction module 210 may be configured to extract a feature map of these images, extracting a total occupied area of these images in the page and/or an area of each image (which may be indicated by the length and the width of the image), and/or respective locations of these images in the page 102 (which are indicated by the two-dimensional coordinates, for example).

In some implementations, a page 102 may include a mixture of a plurality of types of contents or a plurality of content sections of the same type, and these contents or content sections may be arranged in the page 102 in a certain particular manner (which is particularly embodied in presentation slides or pages). In order to explore feature information included in organization of different contents or content sections, the page 102 may be converted into an image, and a feature map of the converted image are extracted by the feature extraction module 210 as hybrid feature information of the page 102. In the example of FIG. 3, the page 102 may be considered as an image, and a feature map of this image may be extracted by the feature extraction module 210.

Different feature information (for example, text-related feature information, image-related feature information and/or hybrid feature information) extracted for the page 102 may be combined as total feature information of the page 102 for determining the importance of the page at the importance determination module 220. It would be appreciated that other types of feature information of the page 102 may also be extracted.

In some implementation, extraction of feature information and measurement of an importance may be implemented based on a neural network. Generally, the neural network is constructed to include one or more network layers, each of which includes one or more neurons. Each neuron processes an input according to a parameter obtained through training, and generates an output. The output of the preceding layer is transmitted to the next layer as an input for further processing. Parameters of all the neurons of the neural network form a set of parameters of the neural network. When the set of parameters of the neural network is determined, the neural network may be operated to perform respective functions. As used herein, the neural network may also be referred as a "leaning network" or a "neural network model." The terms "learning network," "neural network," "neural network model," "model" and "network" may be used interchangeably below.

Figure 4:
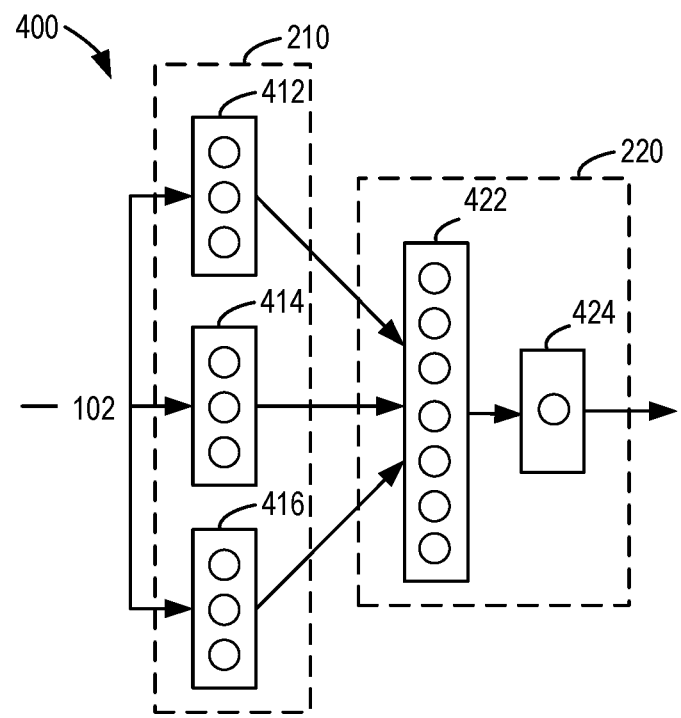
FIG. 4 illustrates a schematic diagram of feature extraction for a page in accordance with an implementation of the subject matter described herein.

FIG. 4 illustrates an example of feature extraction and importance determination based on a neural network 400 in accordance with an implementation of the subject matter described herein. The neural network 400 is used to process each page 102 of the document 152. As shown in FIG. 4, the neural network 400 includes a plurality of sub-networks 412, 414 and 416 for implementing the feature extraction module 220, and these neural sub-networks are provided for text-related feature information, image-related feature information and hybrid feature information of each page 102, respectively.

In some implementations, when the content contained in the page 102 includes a text, the sub-network 412 may be configured to extract a semantic feature of the text and/or feature information indicating the number of words included in the text, as feature information related to the text of the page 102. When extracting the semantic feature, the sub-network 412 may implement semantic feature extraction of the text using a plurality of natural language processing methods. In some implementations, the sub-network 412 may extract a vectorized representation of each word of the text, and vectorized representations of all words are combined as the semantic feature of the text. A vectorized representation of a word may also be referred to as vector code of the word. The vectorized representation of a word may be comprised of a plurality of numerical values included therein. The dimension of vectorized representation of different words may be the same, but the numerical value included therein may be different. A similarity between vectorized representations of words may also indicate a semantic similarity between different words. In other words, there is a small difference between vectorized representations of similar words, while there is a great difference between vectorized representations of words that are completely unrelated.

In some implementations, a vectorized representation of a word may be selected, for example, from a library including pre-trained word vectorized representations, and such library of word vectorized representations may include, for example, Glove vectors, Word2Vec vectors, FastText vectors and the like, of different words. In some other implementations, the sub-network 412 may be trained using different words included in a plurality of documents, such that the sub-network 412 can determine a respective vectorized representation for each word, to indicate a semantic similarity between these words.

In some implementations, all words included in the text of the page 102 are extracted as a sequence words. A symbol visually missing from the text of the page 102, such as a line break, may be replaced with a special token and be included in the sequence of words, facilitating representing an interval between different lines in a text. Since the text of the page 102 may include lots of words and there may be different numbers of words included in texts of different pages 102, in order to enable semantic features of texts of different pages to be comparable, vectorized representations of words may undergo dimension reduction process, and the vectorized representations may be averaged across different words. Specifically, it is supposed that the sequence of words of the text of the page 102 is represented as $S=(w_1, w_2, \ldots, w_n)$, where n is a length of the sequence S and represents the number of words (including the substitution of particular tokens) in the sequence. It is supposed that $W_{Ei}$ represents the vectorized representation of the $i^{th}$ word, and $w_i$ represents a one-hot vector of the vectorized representation of the $i^{th}$ word for dimension reduction. The semantic feature (which is denoted as s) of the text of the page 102 may be represented as an average of vectorized representations of different words in the text, which may be expressed as follows:

$$s = \frac{1}{n}\sum_t W_{Et} e(w_t) \qquad (1)$$

In some implementations, the sub-network 412 may also be configured to extract feature information indicating the number of words contained in the text of the page 102. For example, the number n of words contained in the text of the page 102 may be mapped into a vectorized representation $W_L$. The sub-network 412 may concatenate the vectorized representation of the text of the page 102 and the vectorized representation of the number of words contained in the text, as text-related feature information (which is represented as v) of the page 102, which may be expressed, for example, as follows:

$$v = \begin{bmatrix} s \\ W_L n \end{bmatrix} \qquad (2)$$

Still referring to FIG. 4, when the content contained in the page 102 includes an image, the sub-network 414 may be configured to extract image-related feature information of each page 102, such as a feature map of the image, feature information indicating the occupied area of the image in the page and feature information indicating the location of the image in the page, as mentioned above. When extracting a feature map of the image, the sub-network 414 may include various neural network layers for image processing, to extract, from the image, feature information characterizing various aspects (for example, image color, texture, profile, edge and the like) of the image. For example, the sub-network 414 may include a convolutional neural network (CNN), long short-term memory (LSTM) neural network and the like, which perform well in the image processing field. In some implementations, the sub-network 414 may map the area of each image (or the total image area) in the page 102 into a vectorized representation, or may map the location of each image in the page 102 (for example, two-dimensional coordinates of a center pixel of the page 102) into a vectorized representation. The feature map, area and/or location-related feature information of the image may be concatenated as image-related feature information of the page 102.

Further, the sub-network 416 is configured to extract a feature map of the image as hybrid feature information of the page 102 in a case of converting the page 102 into an image. In some implementations, regardless of the content contained in the sub-network 416 including a text, an image, other types of contents or a mixture thereof, the sub-network 416 can extract hybrid feature information of the page 102. The method of extracting a feature map of the whole image of the page 102 may be similar to the method of extracting a feature map of the image contained in the page 102. For example, the sub-network 416 may include neural networks, such as CNN, LSTM and the like, for extracting a feature map. In some implementations, the sub-network 414 may only extract feature information related to the area and/or location related to the image contained in the page 102, and a feature map of the whole page 102 may be extracted by the sub-network 416.

In some implementations, in order to extract a feature map of the image, the sub-network 414 and/or 416 may use a network portion for executing feature extraction in a pre-trained neural network for image processing. For example, a network layer for performing feature extraction in a neural network for image classifying tasks having been trained in advance may serve as a sub-network 414 or 416.

The feature information extracted by sub-networks 412, 414 and/or 416 may be concatenated and provided to the importance determination module 220. The importance determination module 220 may include one or more network layers 422 for further processing various feature information after being concatenated. The network layer 422 may include, for example, a fully connected layer. Typically, the fully connected layer includes activation neurons with a linear rectified function (ReLU). In some examples, the network layer 422 has a drop function, i.e., during processing process, the network layer 422 drops some neurons temporarily according to a certain probability (i.e., even though these neurons are not involved in processing). The importance determination module 220 may further include a regression unit 424 for determining an importance based on the processed feature information. The regression unit 424 may map the processed feature information into an importance based on various regression functions. Depending on the designed regression function, the feature information may be mapped to a scalar value for indicating the importance.

In some implementations, the sub-networks 412, 414 and/or 416 for feature extraction may employ neural networks for text feature extraction and image feature extraction, which have been trained in advance. In order to further optimize feature extraction of these sub-networks, in some implementations, the pre-trained sub-networks 412, 414 and/or 416 may also be trained together with the network layers 422, 424 for importance determination, so as to further optimize these sub-networks and parameters of the network layers, to enable a cooperation there between for accomplishing the purpose of importance determination. Of course, the sub-networks 412, 414 and/or 416 may also be initialized as random values and trained together with the network layers 422, 424.

During a training process, one or more training documents may be used to enable neural networks in the feature extraction module 210 and the importance determination module 220 to learn the capabilities of feature extraction and importance determination. Each training document may include a plurality of training pages, and a predetermined number of training pages of the training pages are labeled as the summary of the training document. Monitored with the true value information, the parameters of the neural networks in the extraction module 210 and the importance determination module 220 may be adjusted constantly until a target of optimization is fulfilled.

As the summary of the training document, the predetermined number of training pages may be labeled in various manners. One possible manner is a manual label related to whether each training page is used as a summary of a corresponding training document, i.e., the document is reviewed by human being and the following are labeled: whether each training page is important for the training document, how important it is or whether it can serve as the summary of the document. In order to reduce the expensive cost resulting from the manual label, whether each training page is able to serve as the summary of the training document may be labeled automatically, in an implementation. Typically, if a page is important for a document, the page will be presented for a longer time during a process of presenting the entire document. For example, during a process of presenting a presentation slide document, if one slide is of great importance, the speaker will spend more time to present the slide, thus the slide will be presented for a longer time. When browsing a document, such as a presentation slide document, word processing document, webpage and the like, a user probably lingers at an important page of that the user is interested in for a longer time before switching to the next page.

Therefore, in order to obtain the summary of the training document, whether the training page is labeled as a summary may be determined based on duration of presenting each training page during a process of presenting the training document. For example, for each training document, a predetermined number of pages being presented for longer duration in the document may be labeled as the summary of the training document.

In some other implementations, for some types of documents, such as presentation slide documents, the documents may include some remark information. The remark information is information that is used for further interpreting content of a page in during the process of editing the documents. If there is such information, it may be regarded that the page is important and requires more information to interpret. Hence, when determining whether a training page may be identified as a summary, it may be performed based on whether the page includes the remark information. In some implementations, the presence of the remark information in the training page may be used in combination with the duration of presenting the training page to determine whether the page can be labeled as the summary of the training document.

How to extract feature information of each page 102 and how to determine an importance based on the feature information have been discussed above. As mentioned above, after respective importance of all pages 102 of the document 152 are determined, the summary selection module 230 selects a predetermined number of pages based on the importance, and then generates a summary 162 of the document 152 from the selected pages. Specifically, the summary selection module 230 may rank the pages 102 of the document 152 based on the importance, and then selects a predetermined number of pages ranked at the top.

In some implementations, in addition to the importance determined based on the feature information, the summary selection module 230 may determine whether a page 102 may be selected to generate the summary 162 by further considering other information. In an implementation, it may be determined whether a plurality of pages 102 includes attention information. The attention information may be a type of information indicating the probability of important information of the document is high.

For example, an opening or ending portion of a series of pages 102 probably includes pages about an overview or summary of the document. The pages may include some keywords for indicating overview or summary information involved in the content contained in the document, and such information may be viewed as attention information. Consequently, in some implementations, the summary selection module 230 may determine whether the pages 102 include a keyword which may be, for example, "overview," "summary," or the like. A selection of keyword may be set based on different languages. In some implementations, whether the keyword is included may be determined only through the title portion of the text included in the page 102, such as a header line, a title of a chapter and the like. If a certain page 102 includes such keyword, the summary selection module 230 may directly select the page as a part of the summary 162, regardless of the importance of the page. The summary selection module 230 may also adjust the importance of the page (for example, adjusting the importance to a value indicating greater importance by weighting or increasing a certain value) in a case that the page 102 includes the keyword.

In some other implementations, if the document contains a reference to other contents, for example, a reference to a multimedia file (including video, audio, image file and the like) and/or a reference to another document, which means that the content probably included in the page requires further interpretation with extended information of the reference, and thus is important for the entire document. Therefore, the attention information may further include a reference to a multimedia file and/or another document. The summary selection module 230 may further determine whether a page 102 includes a reference to a multimedia file and/or another document. The summary selection module 230 may determine whether the page 102 includes a reference to a multimedia file and/or another document, and then determine whether the page is selected as a part of the summary 162 based on the determined result. For example, if it is determined that a certain page 102 includes a reference to a multimedia file and/or another document, the summary selection module 230 may directly select the page as a part of the summary 162, regardless of the important score of the page. The summary selection module 230 may further adjust the importance of the page (for example, adjusting to a value indicating greater importance by weighting or increasing a certain value) in a case that the page 102 includes a reference to a multimedia file and/or another document.

The summary 162 generated by the summary selection module 230 may be presented to a user in various manners. For example, it is presented via a display of the computing device 100. In some implementations, the predetermined number of selected pages is highlighted in the presentation of the plurality of pages 102. In this way, the page as the summary of the document may be displayed distinctively from other pages, thus the user can distinguish these pages from a great number of pages rapidly and thus may choose to browse these pages first to obtain the main or important content of the document. In some implementations, the predetermined number of selected pages or preview pages corresponding to the predetermined number of pages selected may be presented independently from the document. This is advantageous for a user to capture the main or important content of the document rapidly in a case of needing document preview.

Figure 5A:
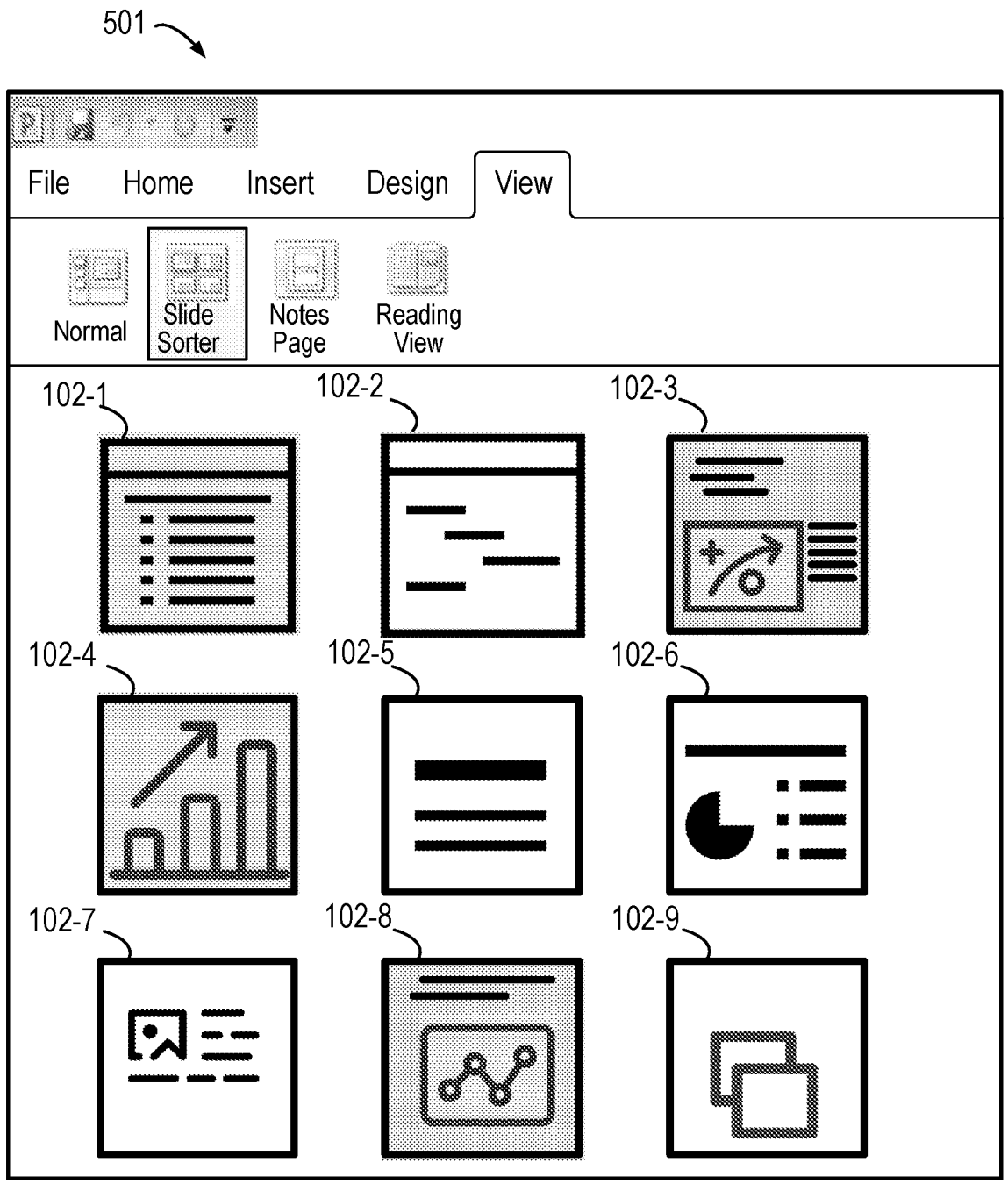
FIGS. 5A-5C illustrate schematic diagrams of example user interfaces for presenting a summary of a document in accordance with some implementations of the subject matter described herein.
Figure 5B:
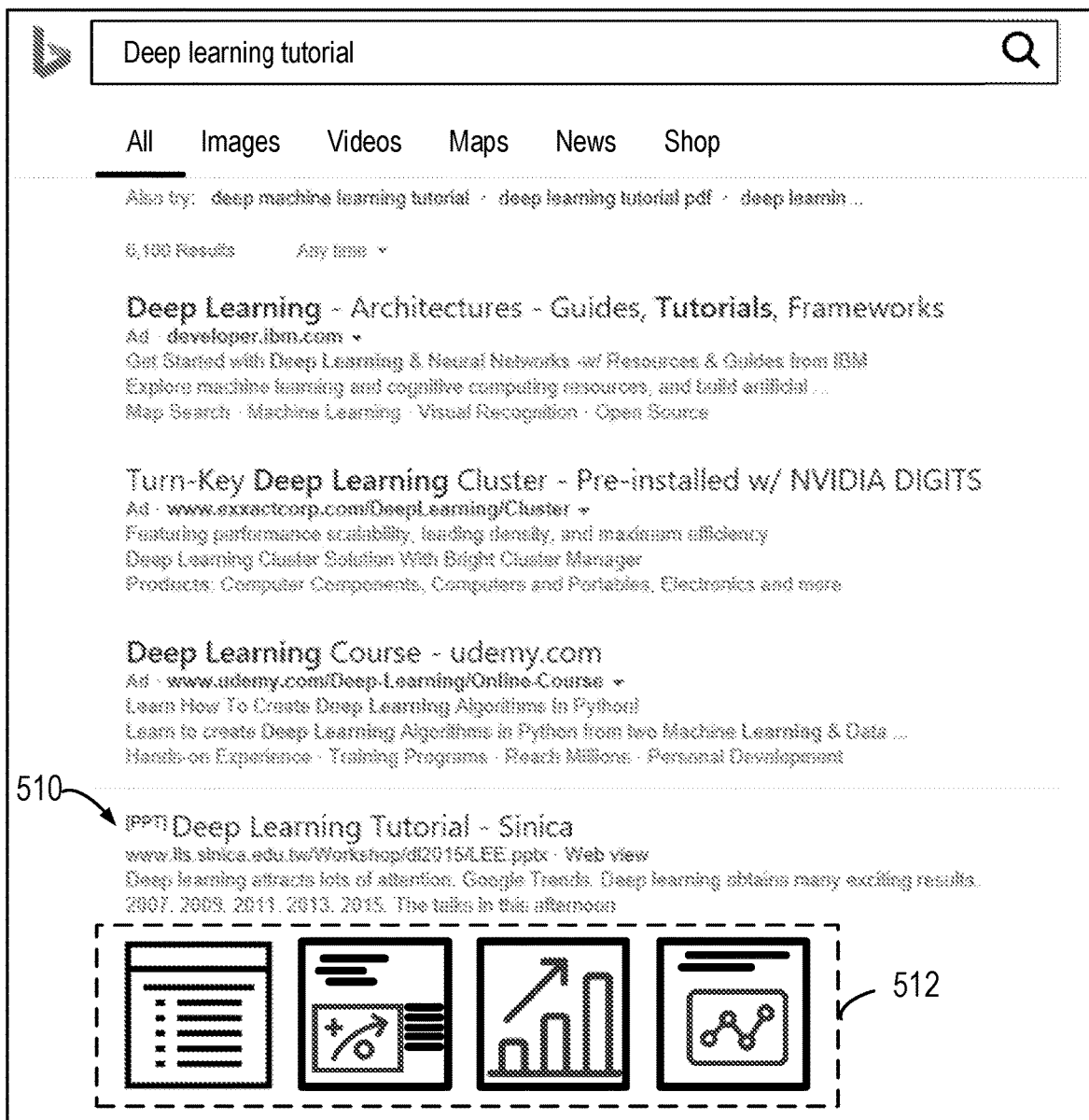
Figure 5C:
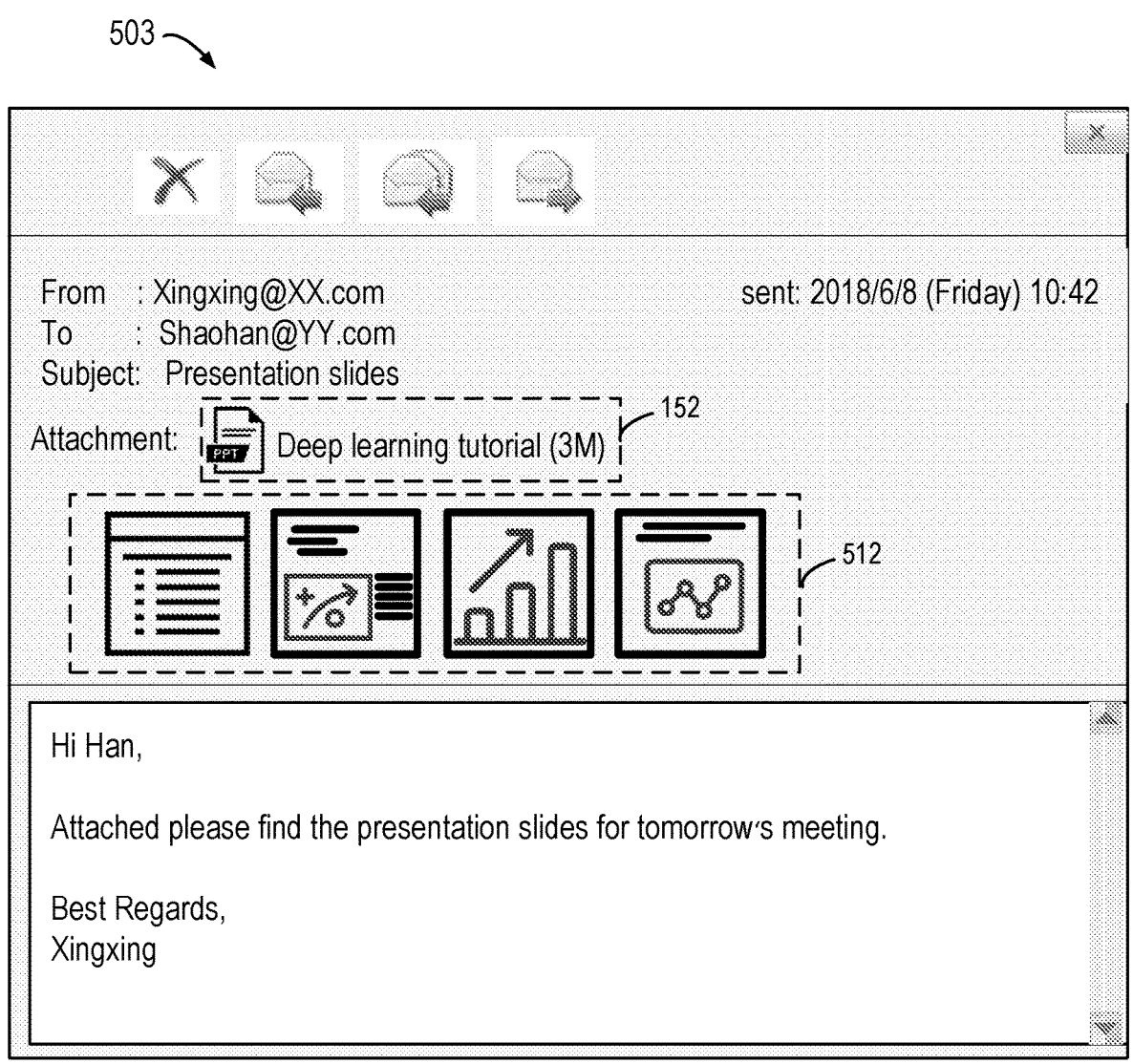

FIGS. 5A to 5C illustrate diagrams of example user interfaces for presenting a summary of a document in accordance with some implementations of the subject matter described herein. In the examples as illustrated in FIGS. 5A to 5C, the document 152 is shown as a presentation slide document. FIG. 5A illustrates a user interface 501 in a presentation slide application, at which a plurality of pages 102-1 to 102-9 of the document 152 are presented in a "Slide Sorter" mode of slide viewing. The pages 102-1, 102-3, 102-4 and 102-8 selected from these pages as the summary of the document 162 are highlighted.

FIG. 5B illustrates a user interface 502 of a search application in a search scenario. The user interface 502 displays search results related to a search term "Deep learning tutorial" returned from a search application, where one search result 510 includes a presentation slide document related to the search term "Deep learning tutorial", which includes a plurality of slides. Together with the search results, preview pages 512 corresponding to a small number of pages of the presentation slide document are displayed, and these pages are selected as the pages for the summary of the document in accordance with implementations of the subject matter described herein. In this way, the user may determine rapidly, from a plurality of search results, whether the search result 510 is the desired search result, and thus may determine whether the corresponding link of the search result 510 should be clicked, so as to further view all pages of the document and/or download the document.

FIG. 5C illustrates a user interface 503 of an application of receiving and sending email in a scenario of receiving and sending email. The user interface 503 displays an email received through the application of receiving and sending email, the email includes a presentation slide document 152 as an attachment. The user interface 503 also displays preview pages 512 corresponding to a small number of pages of the presentation slide document 152, and these pages are selected as pages of the summary of the document in accordance with the implementations of the subject matter described herein. As such, the user viewing the email may determine the main or important content of the attachment of the email rapidly, and thus determine the next action, for example, whether the attachment is to be further viewed, how the email is replied, and the like.

FIG. 5A-5C illustrates some examples for presenting of a summary of a document. According to requirements in the actual applications, the summary of the document may be displayed in various manners. The subject matter described herein is not limited in this regard.

Figure 6:
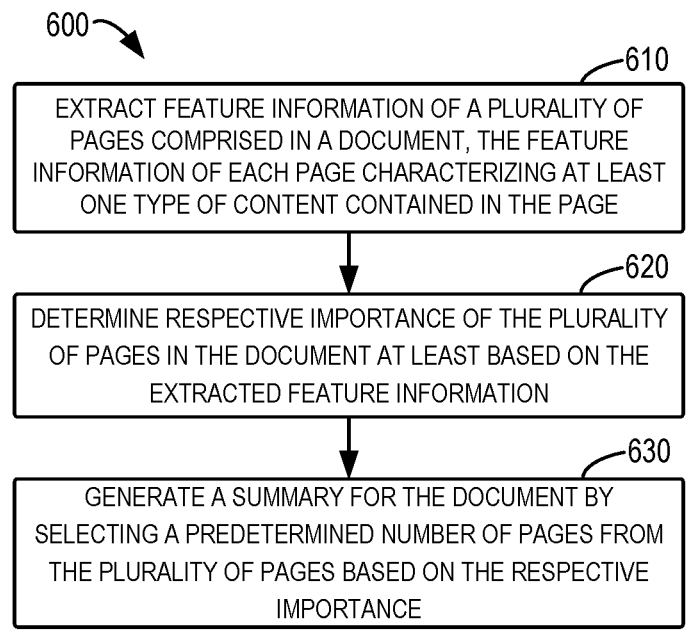
FIG. 6 illustrates a flowchart of a process for generating a summary of a document in accordance with an implementation of the subject matter described herein.

FIG. 6 illustrates a flowchart of a process 600 of generating a summary of a document in accordance with some implementations of the subject matter described herein. The process 600 may be implemented by the computing device 100, for example implemented at the summary generating module 122 in the memory 120 of the computing device 100. At block 610, the computing device 100 extracts feature information of a plurality of pages comprised in the document, the feature information of each page characterizing at least one type of content contained in the page. At block 620, the computing device 100 determines respective importance of the plurality of pages in the document at least based on the extracted feature information. At block 630, the computing device 100 generates a summary for the document by selecting a predetermined number of pages from the plurality of pages based on the respective importance, the predetermined number being less than the number of the plurality of pages.

In some implementations, extracting the feature information of the plurality of pages comprises: for each page, determining whether content contained in the page comprises a text; and in response to the content contained in the page comprising the text, extracting at least one of a semantic feature of the text and feature information indicating the number of words comprised in the text, as text-related feature information of the page.

In some implementations, extracting the feature information of the plurality of pages comprises: for each page, determining whether content contained in the page comprises an image; and in response to the content contained in the page comprises the image, extracting at least one of a feature map of the image, feature information indicating an occupied area of the image in the page, and feature information indicating a location of the image in the page, as image-related feature information of the page.

In some implementations, extracting the feature information of the plurality of pages comprises: for each page, converting the page into an image; and extracting a feature map from the image as hybrid feature information of the page.

In some implementations, selecting the predetermined number of pages from the plurality of pages further comprises: determining whether the plurality of pages comprises attention information, the attention information comprising at least one of the following: a keyword, a reference to a multimedia file and a reference to a further document; and selecting the predetermined number of pages from the plurality of pages further based on presence of the attention information in the plurality of pages.

In some implementations, extracting the feature information of the plurality of pages comprises: extracting the feature information of the plurality of pages using a neural network, and determining the respective importance of the plurality of pages comprises: determining the respective importance of the plurality of pages using the neural network.

In some implementations, the neural network is trained using a training document comprising a plurality of training pages, the predetermined number of training pages of the plurality of training pages being labeled as a summary of the training document based on at least one of the following: a duration of presenting the training pages during a presentation of the training document, remark information contained in the training pages, and a manual label related to whether the training pages are used as the summary of the training document.

In some implementations, the process 600 further comprises: highlighting the predetermined number of selected pages in a presentation of the plurality of pages.

In some implementations, the process 600 further comprises: presenting the predetermined number of selected pages or preview pages corresponding to the predetermined number of pages independently from the document.

In some implementations, the document is selected from a group consisting of: a presentation slide document, a word processing document, a webpage and a printable document format (PDF) document.

Some example implementations of the subject matter described herein are given below.

In an aspect, the subject matter described herein provides a computer-implemented method. The method comprises: extracting feature information of a plurality of pages comprised in a document, the feature information of each page characterizing at least one type of content contained in the page; determining respective importance of the plurality of pages in the document at least based on the extracted feature information; and generating a summary for the document by selecting a predetermined number of pages from the plurality of pages based on the respective importance, the predetermined number being less than the number of the plurality of pages.

In some implementations, extracting the feature information of the plurality of pages comprises: for each page, determining whether content contained in the page comprises a text; and in response to the content contained in the page comprising the text, extracting at least one of a semantic feature of the text and feature information indicating the number of words comprised in the text, as text-related feature information of the page.

In some implementations, extracting the feature information of the plurality of pages comprises: for each page, determining whether content contained in the page comprises an image; and in response to the content contained in the page comprising the image, extracting at least one of a feature map of the image, feature information indicating an occupied area of the image in the page, and feature information indicating a location of the image in the page, as image-related feature information of the page.

In some implementations, extracting the feature information of the plurality of pages comprises: for each page, converting the page into an image; and extracting a feature map from the image as hybrid feature information of the page.

In some implementations, selecting the predetermined number of pages from the plurality of pages further comprises: determining whether the plurality of pages comprises attention information, the attention information comprising at least one of the following: a keyword, a reference to a multimedia file and a reference to a further document; and selecting the predetermined number of pages from the plurality of pages further based on presence of the attention information in the plurality of pages.

In some implementations, extracting the feature information of the plurality of pages comprises: extracting the feature information of the plurality of pages using a neural network, and determining the respective importance of the plurality of pages comprises: determining the respective importance of the plurality of pages using the neural network.

In some implementations, the neural network is trained using a training document comprising a plurality of training pages, the predetermined number of training pages of the plurality of training pages being labeled as a summary of the training document based on at least one of the following: a duration of presenting the training pages during a presentation of the training document, remark information contained in the training pages, and a manual label related to whether the training pages are used as the summary of the training document.

In some implementations, the method further comprises: highlighting the predetermined number of selected pages in a presentation of the plurality of pages.

In some implementations, the method further comprises: presenting the predetermined number of selected pages or preview pages corresponding to the predetermined number of pages independently from the document.

In some implementations, the document is selected from a group consisting of: a presentation slide document, a word processing document, a webpage and a printable document format (PDF) document.

In a further aspect, the subject matter described herein provides an electronic device. The electronic device comprises: a processing unit; and a memory coupled to the processing unit and having instructions stored thereon which, when executed by the processing unit, cause the device to perform acts comprising: extracting feature information of a plurality of pages comprised in a document, the feature information of each page characterizing at least one type of content contained in the page; determining respective importance of the plurality of pages in the document at least based on the extracted feature information; and generating a summary for the document by selecting a predetermined number of pages from the plurality of pages based on the respective importance, the predetermined number being less than the number of the plurality of pages.

In some implementations, extracting the feature information of the plurality of pages comprises: for each page, determining whether content contained in the page comprises a text; and in response to the content contained in the page comprising the text, extracting at least one of a semantic feature of the text and feature information indicating the number of words comprised in the text, as text-related feature information of the page.

In some implementations, extracting the feature information of the plurality of pages comprises: for each page, determining whether content contained in the page comprises an image; and in response to the content contained in the page comprising the image, extracting at least one of a feature map of the image, feature information indicating an occupied area of the image in the page, and feature information indicating a location of the image in the page, as image-related feature information of the page.

In some implementations, extracting the feature information of the plurality of pages comprises: for each page, converting the page into an image; and extracting a feature map from the image as hybrid feature information of the page.

In some implementations, selecting the predetermined number of pages from the plurality of pages further comprises: determining whether the plurality of pages comprises attention information, the attention information comprising at least one of the following: a keyword, a reference to a multimedia file and a reference to a further document; and selecting the predetermined number of pages from the plurality of pages further based on presence of the attention information in the plurality of pages.

In some implementations, extracting the feature information of the plurality of pages comprises: extracting the feature information of the plurality of pages using a neural network, and wherein determining the respective importance of the plurality of pages comprises: determining the respective importance of the plurality of pages using the neural network.

In some implementations, the neural network is trained using a training document comprising a plurality of training pages, the predetermined number of training pages of the plurality of training pages being labeled as a summary of the training document based on at least one of the following: a duration of presenting the training pages during a presentation of the training document, remark information contained in the training pages, and a manual label related to whether the training pages are used as the summary of the training document.

In some implementations, the acts further comprise: highlighting the predetermined number of selected pages in a presentation of the plurality of pages.

In some implementations, the acts further comprise: presenting the predetermined number of selected pages or preview pages corresponding to the predetermined number of pages independently from the document.

In some implementations, the document is selected from a group consisting of: a presentation slide document, a word processing document, a webpage and a printable document format (PDF) document.

In another one aspect, the subject matter described herein provides a computer program product, being tangibly stored on a non-transient computer storage medium and comprising machine-executable instructions which, when executed by a device, cause the device to perform acts comprising: extracting feature information of a plurality of pages comprised in a document, the feature information of each page characterizing at least one type of content contained in the page; determining respective importance of the plurality of pages in the document at least based on the extracted feature information; and generating a summary for the document by selecting a predetermined number of pages from the plurality of pages based on the respective importance, the predetermined number being less than the number of the plurality of pages.

In some implementations, extracting the feature information of the plurality of pages comprises: for each page, determining whether content contained in the page comprises a text; and in response to the content contained in the page comprising the text, extracting at least one of a semantic feature of the text and feature information indicating the number of words comprised in the text, as text-related feature information of the page.

In some implementations, extracting the feature information of the plurality of pages comprises: for each page, determining whether content contained in the page comprises an image; and in response to the content contained in the page comprising the image, extracting at least one of a feature map of the image, feature information indicating an occupied area of the image in the page, and feature information indicating a location of the image in the page, as image-related feature information of the page.

In some implementations, extracting the feature information of the plurality of pages comprises: for each page, converting the page into an image; and extracting a feature map from the image as hybrid feature information of the page.

In some implementations, selecting the predetermined number of pages from the plurality of pages further comprises: determining whether the plurality of pages comprises attention information, the attention information comprising at least one of the following: a keyword, a reference to a multimedia file and a reference to a further document; and selecting the predetermined number of pages from the plurality of pages further based on presence of the attention information in the plurality of pages.

In some implementations, extracting the feature information of the plurality of pages comprises: extracting the feature information of the plurality of pages using a neural network, and determining the respective importance of the plurality of pages comprises: determining the respective importance of the plurality of pages using the neural network.

In some implementations, the neural network is trained using a training document comprising a plurality of training pages, the predetermined number of training pages of the plurality of training pages being labeled as a summary of the training document based on at least one of the following: a duration of presenting the training pages during a presentation of the training document, remark information contained in the training pages, and a manual label related to whether the training pages are used as the summary of the training document.

In some implementations, the machine executable instruction, when executed by a device, causes the device to: highlight the predetermined number of selected pages in a presentation of the plurality of pages.

In some implementations, the machine executable instruction, when executed by a device, causes the device to: present the predetermined number of selected pages or preview pages corresponding to the predetermined number of pages independently from the document.

In some implementations, the document is selected from a group consisting of: a presentation slide document, a word processing document, a webpage and a printable document format (PDF) document.

In a still further aspect, the subject matter described herein provides a computer-readable medium, which is tangibly stored on a non-transient computer storage medium and comprises machine-executable instructions which, when executed by a device, causes the device to perform the method in accordance with the above aspects.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely or partly on a machine, executed as a stand-alone software package partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
    extracting feature information of a plurality of pages comprised in a document, the feature information of each page characterizing at least one type of content contained in the page, wherein extracting the feature information comprises:
        determining, for each page, whether content contained in the page comprises an image; and
        in response to the content contained in the page comprising the image, extracting at least one of a feature map of the image, feature information indicating an occupied area of the image in the page, and feature information indicating a location of the image in the page, as image-related feature information of the page, wherein the feature map is a vectorized representation of the image in the page;
    determining respective importance of the plurality of pages in the document at least based on the extracted feature information;
    determining an importance threshold based on a number of pages in the document; and
    generating a summary for the document by selecting a predetermined number of pages from the plurality of pages based on the respective importance being within the importance threshold, the predetermined number being less than a number of the plurality of pages.

2. The method of claim 1, wherein extracting the feature information of the plurality of pages comprises: for each page,
- determining whether content contained in the page comprises a text; and
- in response to the content contained in the page comprising the text, extracting at least one of a semantic feature of the text and feature information indicating a number of words comprised in the text, as text-related feature information of the page.

3. The method of claim 1, wherein extracting the feature information of the plurality of pages comprises: for each page,
- converting the page into an image; and
- extracting a feature map from the image as hybrid feature information of the page.

4. The method of claim 1, wherein selecting the predetermined number of pages from the plurality of pages further comprises:
- determining whether the plurality of pages comprises attention information, the attention information comprising at least one of the following:
  - a keyword, a reference to a multimedia file, and a reference to a further document; and
- selecting the predetermined number of pages from the plurality of pages further based on presence of the attention information in the plurality of pages.

5. The method of claim 1, wherein extracting the feature information of the plurality of pages comprises:
- extracting the feature information of the plurality of pages using a neural network, and wherein determining the respective importance of the plurality of pages comprises:
  - determining the respective importance of the plurality of pages using the neural network.

6. The method of claim 5, wherein the neural network is trained using a training document comprising a plurality of training pages, a predetermined number of training pages of the plurality of training pages being labeled as a summary of the training document based on at least one of the following:
- a duration of presenting the training pages during a presentation of the training document,
- remark information contained in the training pages, and
- a manual label related to whether the training pages are used as the summary of the training document.

7. The method of claim 1, further comprising:
- highlighting the predetermined number of selected pages in a presentation of the plurality of pages.

8. The method of claim 1, further comprising:
- presenting the predetermined number of selected pages or preview pages corresponding to the predetermined number of pages independently from the document.

9. The method of claim 1, wherein the document is selected from a group consisting of: a presentation slide document, a word processing document, a webpage, and a printable document format (PDF) document.

10. An electronic device, comprising:
- a processing unit; and
- a memory coupled to the processing unit and having instructions stored thereon which, when executed by the processing unit, cause the device to perform acts comprising:
  - extracting feature information of a plurality of pages comprised in a document, the feature information of each page characterizing at least one type of content contained in the page, extracting the feature information comprising instructions to:
    - determine, for each page, whether content contained in the page comprises an image; and
    - in response to the content contained in the page comprising the image, extract at least one of a feature map of the image, feature information indicating an occupied area of the image in the page, and feature information indicating a location of the image in the page, as image-related feature information of the page, wherein the feature map is a vectorized representation of the image in the page;
  - determining respective importance of the plurality of pages in the document at least based on the extracted feature information;
  - determining an importance threshold based on a number of pages in the document; and
  - generating a summary for the document by selecting a predetermined number of pages from the plurality of pages based on the respective importance being within the importance threshold, the predetermined number being less than a number of the plurality of pages.

11. The device of claim 10, wherein extracting the feature information of the plurality of pages comprises: for each page,
- determining whether content contained in the page comprises a text; and
- in response to the content contained in the page comprising the text, extracting at least one of a semantic feature of the text and feature information indicating a number of words comprised in the text, as text-related feature information of the page.

12. The device of claim 10, wherein extracting the feature information of the plurality of pages comprises: for each page,
- converting the page into an image; and
- extracting a feature map from the image as hybrid feature information of the page.

13. At least one non-transitory machine-readable medium comprising machine-executable instructions which, when executed by at least one processor, cause the at least one processor to perform operations to:
- extract feature information of a plurality of pages comprised in a document, the feature information of each page characterizing at least one type of content contained in the page, extracting the feature information comprising instructions to:
  - determine, for each page, whether content contained in the page comprises an image; and
  - in response to the content contained in the page comprising the image, extract at least one of a feature map of the image, feature information indicating an occupied area of the image in the page, and feature information indicating a location of the image in the page, as image-related feature information of the page, wherein the feature map is a vectorized representation of the image in the page;
- determine respective importance of the plurality of pages in the document at least based on the extracted feature information;
- determine an importance threshold based on a number of pages in the document; and
- generate a summary for the document by selecting a predetermined number of pages from the plurality of pages based on the respective importance being within the importance threshold, the predetermined number being less than a number of the plurality of pages.

14. The at least one non-transitory machine-readable medium of claim 13, wherein the instructions to extract the feature information of the plurality of pages comprises instructions to: for each page,
   determine whether content contained in the page comprises a text; and
   in response to the content contained in the page comprising the text, extract at least one of a semantic feature of the text and feature information indicating a number of words comprised in the text, as text-related feature information of the page.

15. The at least one non-transitory machine-readable medium of claim 13, wherein the instructions to extract the feature information of the plurality of pages comprises instructions to: for each page,
   convert the page into an image; and
   extract a feature map from the image as hybrid feature information of the page.

16. The at least one non-transitory machine-readable medium of claim 13, wherein the instructions to select the predetermined number of pages from the plurality of pages further comprises instructions to:
   determine whether the plurality of pages comprises attention information, the attention information comprising at least one of the following:
      a keyword, a reference to a multimedia file, and a reference to a further document; and
   select the predetermined number of pages from the plurality of pages further based on presence of the attention information in the plurality of pages.

17. The at least one non-transitory machine-readable medium of claim 13, wherein the instructions to extract the feature information of the plurality of pages comprises instructions to:
   extract the feature information of the plurality of pages using a neural network, and wherein the instructions to determine the respective importance of the plurality of pages comprises instructions to:
      determine the respective importance of the plurality of pages using the neural network.

* * * * *